US010887503B2

(12) United States Patent
Maruyama

(10) Patent No.: US 10,887,503 B2
(45) Date of Patent: Jan. 5, 2021

(54) CONTROL APPARATUS, IMAGE CAPTURING APPARATUS, AND CONTROL METHOD

(71) Applicant: CANON KABUSHIKI KAISHA, Tokyo (JP)

(72) Inventor: Naoki Maruyama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 66 days.

(21) Appl. No.: 16/141,110

(22) Filed: Sep. 25, 2018

(65) Prior Publication Data

US 2019/0098202 A1 Mar. 28, 2019

(30) Foreign Application Priority Data

Sep. 27, 2017 (JP) .................... 2017-186463
Aug. 9, 2018 (JP) .................... 2018-150910

(51) Int. Cl.
*H04N 5/232* (2006.01)
*G03B 13/36* (2006.01)
(Continued)

(52) U.S. Cl.
CPC ......... *H04N 5/23212* (2013.01); *G02B 7/008* (2013.01); *G02B 7/28* (2013.01);
(Continued)

(58) Field of Classification Search
CPC .......... H04N 5/23212; H04N 5/23209; H04N 5/23296; H04N 5/217; H04N 5/22521;
(Continued)

(56) References Cited

U.S. PATENT DOCUMENTS 9,383,540 B1 * 7/2016 Gandhi .................. G03B 13/36
2014/0055623 A1 * 2/2014 Okada ................ H04N 5/23293
348/177

(Continued)

FOREIGN PATENT DOCUMENTS

CN 1503047 A 6/2004
CN 1890592 A 1/2007
(Continued)

OTHER PUBLICATIONS

Extended European Search Report issued by the European Patent Office dated Mar. 11, 2019 in corresponding European Patent Application No. 18196537.7.
(Continued)

*Primary Examiner* — Nhan T Tran
(74) *Attorney, Agent, or Firm* — Carter, DeLuca & Farrell LLP

(57) ABSTRACT

A control apparatus (13) includes a data acquirer (13a) that acquires correction data indicating a relationship between a temperature difference between a temperature detected by a temperature detector (12) and a reference temperature, and a focus movement amount, and a focus controller (13b) that
(Continued)

performs focus correction based on the temperature difference and the correction data to perform focus control, and the focus controller (13b) changes the focus correction depending on a drive state of a temperature changer (17) that changes a temperature.

9 Claims, 6 Drawing Sheets

(51) Int. Cl.
| | |
|---|---|
| *G02B 7/28* | (2006.01) |
| *G02B 7/00* | (2006.01) |
| *H04N 5/217* | (2011.01) |
| *H04N 5/225* | (2006.01) |
| *G02B 26/12* | (2006.01) |

(52) U.S. Cl.
CPC ............ *G03B 13/36* (2013.01); *H04N 5/217* (2013.01); *H04N 5/22521* (2018.08); *H04N 5/23209* (2013.01); *H04N 5/23296* (2013.01); *G02B 26/128* (2013.01)

(58) Field of Classification Search
CPC ........ G02B 7/008; G02B 7/28; G02B 26/128; G03B 13/36
See application file for complete search history.

(56) References Cited

U.S. PATENT DOCUMENTS

| | | | |
|---|---|---|---|
| 2014/0093228 A1* | 4/2014 | Gredegard | G03B 3/04 396/97 |
| 2014/0098220 A1* | 4/2014 | Nunnink | H04N 5/225 348/135 |
| 2017/0343765 A1* | 11/2017 | Maruyama | G02B 7/023 |
| 2018/0149826 A1* | 5/2018 | Lei | G03B 13/36 |

FOREIGN PATENT DOCUMENTS

| | | |
|---|---|---|
| CN | 101197938 A | 6/2008 |
| CN | 101900923 A | 12/2010 |
| JP | H06117920 A | 4/1994 |
| JP | 2005331790 A | 12/2005 |
| JP | 2009060459 A | 3/2009 |
| JP | 2013164452 A | 8/2013 |

OTHER PUBLICATIONS

Notification of First Office Action issued by the China National Intellectual Property Administration dated Jul. 2, 2020 in corresponding CN Patent Application No. 201811132118.4, with English translation.

* cited by examiner

CONTROL APPARATUS, IMAGE CAPTURING APPARATUS, AND CONTROL METHOD

BACKGROUND OF THE INVENTION

Field of the Invention

The present invention relates to an image capturing apparatus that performs focus control.

Description of the Related Art

Conventionally, there is an image capturing apparatus that controls the position of a focus lens where an image capturing optical system is focused on an object. In such image capturing apparatuses, an image capturing apparatus that is provided with a memory which stores electronic cam data indicating the position of the focus lens that is in focus with respect to each of a plurality of object distances for each zoom position of the image capturing optical system capable of zooming is known. This image capturing apparatus can continue focusing on the object at the same distance, that is, fix the focus position, even when the zoom position is changed, by performing zoom tracking for controlling the position of the focus lens by using the electronic cam data in zooming.

By the way, even when the focus position is fixed, the position of the focus lens changes due to expansion or contraction of the image capturing optical system or the image capturing apparatus caused by temperature change, and accordingly blurring (focus deviation or defocusing) occurs. In order to correct such blurs, a method is known in which the temperature is detected by a temperature sensor, and the position of the focus lens is corrected according to a temperature change amount.

However, in an image capturing apparatus equipped with a cooling fan for radiating heat, a temperature indicated by the temperature sensor may be different from an actual temperature of a lens due to a change in a rotation speed of the fan. In such a case, blurs cannot be satisfactorily corrected even if the position of the focus lens is corrected using the temperature change amount obtained from the temperature sensor.

Japanese Patent Laid-open No. H6-117920 discloses an image capturing apparatus that performs satisfactory focus correction even when the temperature of the lens is different from a temperature value acquired by the temperature sensor.

However, in the image capturing apparatus disclosed in Japanese Patent Laid-open No. H6-117920, it is necessary to provide a reference light source, a pinhole, a beam splitter, and the like inside the image capturing apparatus. Therefore, the image capturing apparatus becomes complicated, and the cost and size of the image capturing apparatus increase.

BRIEF SUMMARY OF THE INVENTION

The present invention provides a control apparatus, an image capturing apparatus, and a control method which are capable of satisfactorily correcting a focus deviation caused by a temperature change of an image capturing optical system with a simple configuration.

A control apparatus as one aspect of the present invention includes a data acquirer configured to acquire correction data indicating a relationship between a temperature difference between a temperature detected by a temperature detector and a reference temperature, and a focus movement amount, and a focus controller configured to perform focus correction based on the temperature difference and the correction data to perform focus control, and the focus controller is configured to change the focus correction depending on a drive state of a temperature changer that changes a temperature.

A control apparatus as another aspect of the present invention includes a data acquirer configured to acquire correction data indicating a relationship between a temperature difference between a temperature detected by a temperature detector and a reference temperature, and a focus movement amount, and a focus controller configured to perform focus correction based on the temperature difference and the correction data to perform focus control, and the focus controller is configured to change the focus correction depending on a state of a setting changer that changes a setting of a function of an image capturing apparatus.

An image capturing apparatus as another aspect of the present invention includes an image sensor configured to photoelectrically convert an optical image formed via an image capturing optical system, a temperature detector configured to detect a temperature, a data acquirer configured to acquire correction data indicating a relationship between a temperature difference between a temperature detected by the temperature detector and a reference temperature, and a focus movement amount, a focus controller configured to perform focus correction based on the temperature difference and the correction data to perform focus control, and a temperature changer configured to change a temperature, and the focus controller is configured to change the focus correction depending on a drive state of the temperature changer.

An image capturing apparatus as another aspect of the present invention includes an image sensor configured to photoelectrically convert an optical image formed via an image capturing optical system, a temperature detector configured to detect a temperature, a data acquirer configured to acquire correction data indicating a relationship between a temperature difference between a temperature detected by the temperature detector and a reference temperature, and a focus movement amount, a focus controller configured to perform focus correction based on the temperature difference and the correction data to perform focus control, and a setting changer configured to change a setting of a function of the image capturing apparatus, and the focus controller is configured to change the focus correction depending on a state of the setting changer.

A control method as another aspect of the present invention includes the steps of acquiring correction data indicating a relationship between a temperature difference between a temperature detected by a temperature detector and a reference temperature, and a focus movement amount, and performing focus correction based on the temperature difference and the correction data to perform focus control, and the step of performing the focus control includes changing the focus correction depending on a drive state of a temperature changer that changes a temperature.

A control method as another aspect of the present invention includes the steps of acquiring correction data indicating a relationship between a temperature difference between a temperature detected by a temperature detector and a reference temperature, and a focus movement amount, and performing focus correction based on the temperature difference and the correction data to perform focus control, and the step of performing the focus control includes changing the focus correction depending on a state of a setting changer that changes a setting of an image capturing apparatus.

Further features and aspects of the present invention will become apparent from the following description of exemplary embodiments with reference to the attached drawings.

DESCRIPTION OF THE EMBODIMENTS

Exemplary embodiments of the present invention will be described below with reference to the accompanied drawings.

Figure 1:
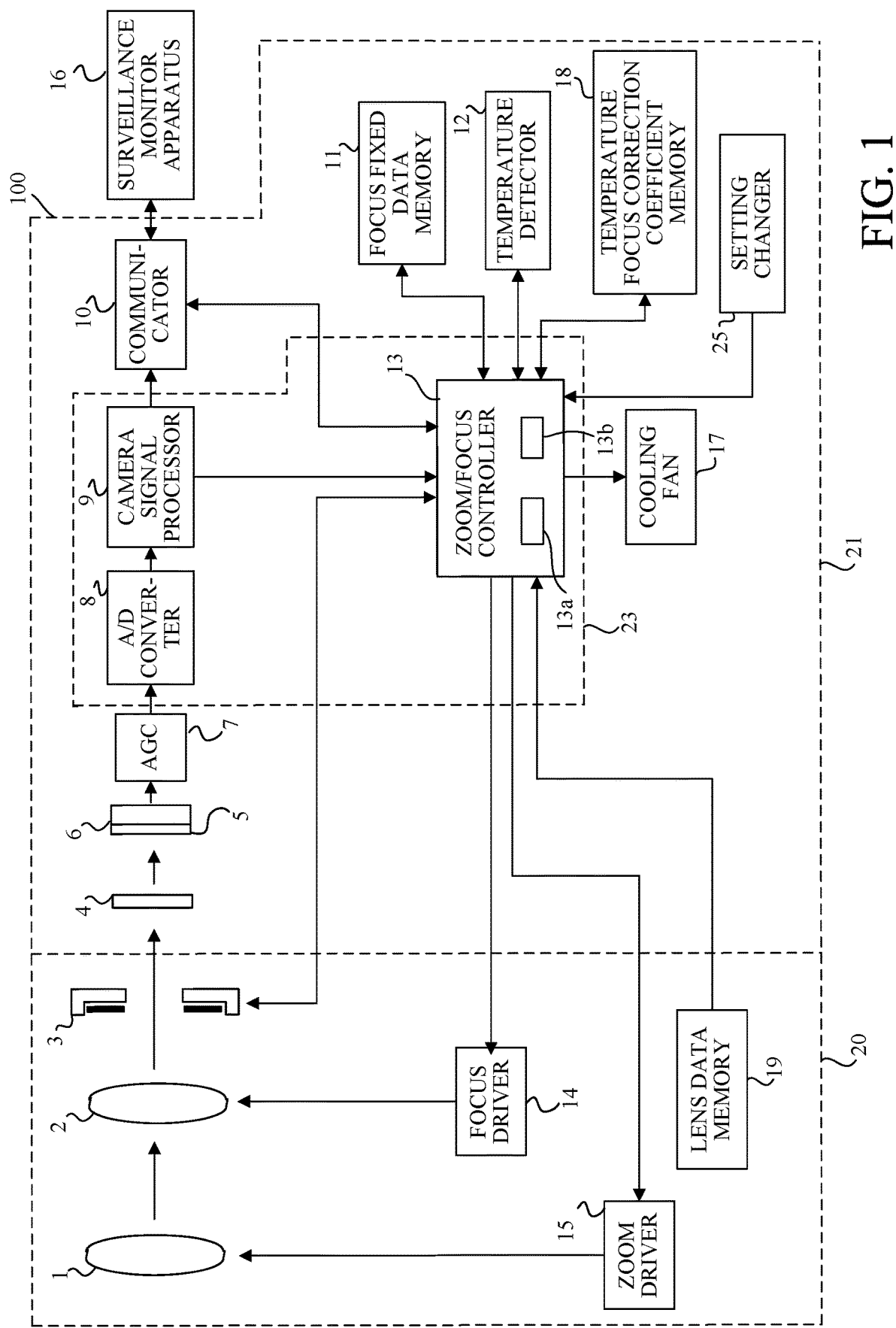
FIG. 1 is a block diagram of an image capturing apparatus in each embodiment.

First, referring to FIG. 1, the internal configuration of an image capturing apparatus in this embodiment will be described. FIG. 1 is a block diagram of an image capturing apparatus 100. In this embodiment, in particular, a focus control method of correcting a focus deviation (defocus) due to a temperature change will be described.

An image capturing optical system includes a zoom lens (magnification-varying lens) 1 that moves in an optical axis direction to change a focal length, a focus lens 2 that moves in the optical axis direction to perform focusing, and an aperture unit 3 that adjusts a light amount. Light passing through the image capturing optical system forms an object image as an optical image on an image sensor 6 via a band pass filter 4 and a color filter 5. The image sensor 6 includes a CMOS sensor or a CCD sensor, and it photoelectrically converts the object image formed via the image capturing optical system. An AGC 7 performs gain adjustment on an analog electric signal (imaging signal) output from the image sensor 6. An A/D converter 8 converts the gain-adjusted analog electric signal into a digital signal. A camera signal processor 9 performs various image processing on the digital signal (digital imaging signal) to generate an image signal. The image signal is output to a surveillance monitor apparatus 16 connected to the image capturing apparatus 100 via a communicator 10 by wired or wireless communication, and it is output to a zoom/focus controller 13 of the image capturing apparatus 100.

A focus fixed data memory 11 stores mode information indicating on/off of the focus position fixed mode that is a mode of fixing the focus position corresponding to an in-focus object distance and a mode selected in the focus position fixed mode. The mode information is written in the focus fixed data memory 11 via the communicator 10 and the zoom/focus controller 13 by communication from the surveillance monitor apparatus 16 operated by a user (observer). The mode information automatically transfers to the fixed mode at the completion of manual focus (MF) or autofocus (AF) processing caused by the operation of the user.

The zoom/focus controller 13 performs focus control (AF control) using a contrast evaluation value indicating a contrast state of the image signal calculated from the image signal, temperature focus correction control described below, control of the cooling fan 17, and the like. The zoom/focus controller 13 controls a focus driver 14 to drive the focus lens 2 in the optical axis direction. Further, the zoom/focus controller 13 controls the zoom driver 15 to drive the zoom lens 1 in the optical axis direction.

A temperature detector (temperature detection unit) 12 detects the temperature of the image capturing apparatus 100. The zoom/focus controller 13 acquires the temperature (temperature information) through the temperature detector 12 at predetermined time intervals to monitor a change in temperature. As the temperature detector 12, a temperature sensor such as a thermistor is used. A cooling fan (temperature changer) 17 circulates the air inside and outside the image capturing apparatus 100 to cool the image capturing apparatus 100. The operation mode of the cooling fan 17 can be selected from a total of five modes of four constant speed modes of a high speed mode, a medium speed mode, a low speed mode, and a stop mode, and an automatic mode in which these modes are automatically switched according to the temperature detected by the temperature detector 12. The default is set to the automatic mode.

A temperature focus correction coefficient memory (memory) 18 holds (stores) a correction coefficient (correction data) used for a temperature focus correction process described below. Preferably, the correction coefficient is stored for each type or each zoom position of a lens barrel (image capturing optical system) 20. A lens data memory 19 stores lens identification information such as a lens ID, a lens name, and a serial number, and position information of the focus lens 2 and the zoom lens 1.

The zoom/focus controller 13 includes a data acquirer 13a and a focus controller 13b. The data acquirer 13a acquires a correction coefficient (correction data) indicating the relationship between a temperature difference between a temperature detected by the temperature detector 12 and a reference temperature, and a focus movement amount. The focus controller 13b performs focus correction based on the temperature difference and the correction coefficient to perform focus control. Further, the focus controller 13b changes the focus correction depending on a drive state of the cooling fan (temperature changer that changes the temperature) 17 (i.e., it performs different focus correction according to the drive state of the temperature changer). That is, the focus controller 13b changes at least one of a temperature offset amount (offset amount with respect to the detected temperature or the reference temperature) or the correction coefficient (correction data) according to the drive state of the cooling fan 17. This will be described in detail below. A setting changer (setting changing unit) 25 changes a setting of a function of the image capturing apparatus 100. For example, the setting changer 25 changes the setting of the panning/tilting function (pan-tilt function) that changes a direction (imaging direction) of the image capturing apparatus 100.

Figure 2:
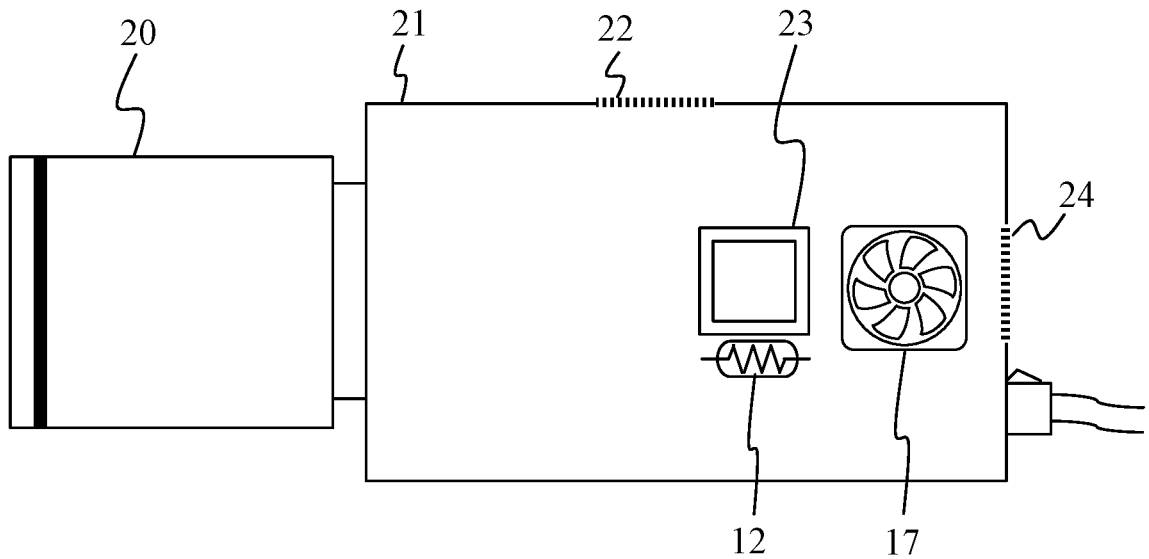
FIG. 2 is a configuration diagram of the image capturing apparatus in each embodiment.

Next, referring to FIG. 2, the structural configuration of the image capturing apparatus 100 will be described. FIG. 2 is a configuration diagram of the image capturing apparatus 100. The image capturing apparatus 100 includes an image capturing apparatus body 21 and a lens barrel (interchangeable lens) 20 removably attached to the image capturing apparatus body 21. However, this embodiment is not limited to this, and can also be applied to an image capturing apparatus in which the image capturing apparatus body and the lens barrel are integrally formed.

The lens barrel 20 includes a zoom lens 1, a focus lens 2, an aperture unit 3, a focus driver 14, a zoom driver 15, and a lens data memory 19, and it is interchangeable according to the application. The image capturing apparatus body 21 includes the elements illustrated in FIG. 1 other than the lens barrel 20 and the surveillance monitor apparatus 16. A processor 23 is an arithmetic processing unit (CPU) including the A/D converter 8, the camera signal processor 9, and the zoom/focus controller 13. The cooling fan 17 is provided mainly for cooling the processor 23, and it is disposed near the processor 23 together with the temperature detector 12. When the cooling fan 17 is operated, outside air is sucked from an air inlet 22, passes around the processor 23, and is exhausted from an air outlet 24.

Figure 3:
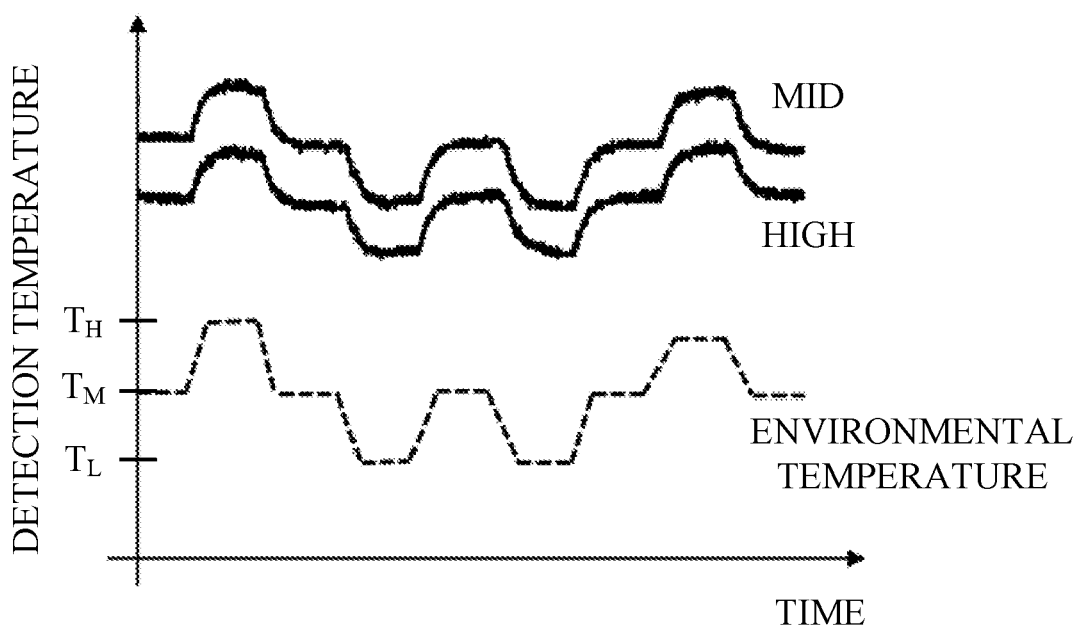
FIG. 3 is an explanatory diagram illustrating how a detection temperature varies depending on a rotation state of a cooling fan in each embodiment.

Next, referring to FIG. 3, an outline of the temperature focus correction process (focus correction processing according to the temperature) will be described. FIG. 3 is an explanatory diagram illustrating how the detection temperature (the temperature detected by the temperature detector 12) varies according to the drive state (rotation state) of the cooling fan 17, and the horizontal axis represents time and the vertical axis represents the detection temperature. In FIG. 3, the detection temperature is illustrated when an environmental temperature (broken line) is changed to a normal temperature $T_M$, a high temperature $T_H$, and a low temperature $T_L$. The environmental temperature is the outside air temperature of the image capturing apparatus 100. Further, in FIG. 3, the detection temperature when the number of rotations of the cooling fan 17 is set to high (when the rotation speed is high) is indicated as High, and the detection temperature when the number of rotations is set to low (when the rotation speed is low) is indicated as Mid.

As illustrated in FIG. 3, even when the environmental temperature is the same, the detection temperature varies depending on the rotation speed of the cooling fan 17, and an increase or decrease in the detection temperature occurs at a constant rate according to the rotation speed of the cooling fan 17.

Conventionally, as an example of a method of correcting the focus deviation (defocus) due to a certain temperature, a method of moving the focus based on a temperature variation amount as to whether the temperature increases or decreases from a predetermined reference temperature is known. However, when the focus correction is performed by such a method, as illustrated in FIG. 3, if the detection temperature varies depending on the drive state (rotation state) of the cooling fan 17 even under the same normal temperature environment, an appropriate correction amount cannot be calculated as a focus correction amount, and as a result the blurring (defocusing) occurs.

Specifically, in a case where the detection temperature when the number of rotations of the cooling fan 17 is low (LOW) is 30 deg C. with the environmental temperature of 20 deg C. as the reference temperature, the detection temperature of 30 deg C. can be converted to correspond to the environmental temperature of 20 deg C. Therefore, when the detection temperature changes to 35 deg C., it can be determined that the state has changed from the reference state to the high temperature state by 5 deg C., and the focus correction is performed in accordance with the high temperature state by 5 deg C. from the reference state.

On the other hand, when the number of rotations of the cooling fan 17 is set to a high state (HIGH), the detection temperature becomes, for example, 20 deg C. Therefore, on the basis of the reference state that the detection temperature of 30 deg C. corresponds to the environmental temperature of 20 deg C., if the detection temperature becomes 20 deg C. due to the influence of the cooling fan 17, it is erroneously determined that the environmental temperature is decreased to 10 deg C., and as a result the focus correction corresponding to the state where the temperature is decreased by 10 deg C. from the reference state is performed. This embodiment relates to a method of preventing such erroneous detection and erroneous correction and will be described in detail in each embodiment below.

Embodiment 1

Figure 4:
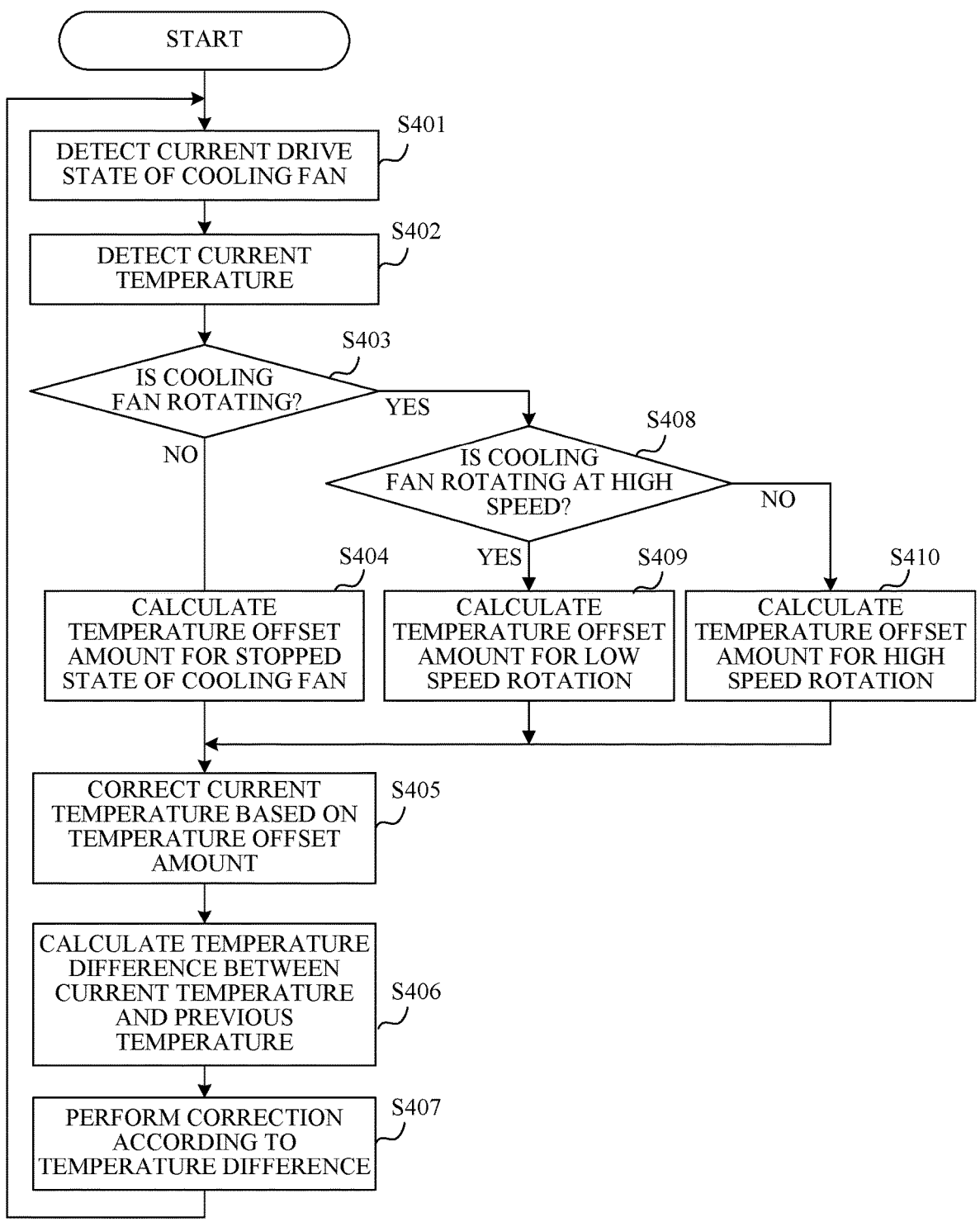
FIG. 4 is a flowchart illustrating a method of a temperature focus correction in Embodiment 1.

First, referring to FIG. 4, a temperature focus correction method (correction method according to a detection temperature) in Embodiment 1 will be described. FIG. 4 is a flowchart illustrating the temperature focus correction method in this embodiment. Each step of FIG. 4 is mainly performed by the zoom/focus controller 13 (the data acquirer 13a and the focus controller 13b).

First, at step S401, the zoom/focus controller 13 detects a current drive state (rotation state) of the cooling fan 17. The drive state of the cooling fan 17 can be detected based on the detection of the actual number of rotations or the like of the cooling fan 17 or the drive mode (rotation mode such as a low speed mode and a high speed mode) set for the cooling fan 17. Further, at step S401, the zoom/focus controller 13 compares the current drive state (the number of rotations or rotation speed) of the cooling fan with the previous drive state (the number of rotations or rotation speed), and thus it can detect whether the number of rotations of the cooling fan 17 is changed.

Subsequently, at step S402, the zoom/focus controller 13 detects the current temperature using the temperature detector 12. Subsequently, at step S403, the zoom/focus controller 13 determines whether the cooling fan 17 is being driven (rotating). When the cooling fan 17 is not being driven, the flow proceeds to step S404. On the other hand, when the cooling fan 17 is being driven, the flow proceeds to step S408. At step S408, the zoom/focus controller 13 determines whether the cooling fan 17 is being driven at high speed (high speed rotation), that is, whether the high speed mode is set. When the cooling fan 17 is rotating at a high speed (in the high speed mode), the flow proceeds to step S410. On the other hand, when the cooling fan 17 is not rotating at high speed (in the low speed mode), the flow proceeds to step S409.

At step S404, the zoom/focus controller 13 calculates a temperature offset amount (temperature offset amount for a stopped state of the cooling fan: a first temperature offset amount) corresponding to a state in which the cooling fan 17 is stopped (stopped state). At step S409, the zoom/focus controller 13 calculates a temperature offset amount (temperature offset amount for low speed rotation: a second temperature offset amount) corresponding to a state in which the cooling fan 17 is rotating at a low speed. At step S410, the zoom/focus controller 13 calculates a temperature offset amount (temperature offset amount for high speed rotation: a third temperature offset amount) corresponding to a state in which the cooling fan 17 is rotating at a high speed.

In this embodiment, as the rotation speed of the cooling fan 17 is higher, the temperature offset amount is smaller as compared with the case where it is not so. This is because the higher the rotation speed of the cooling fan 17 is, the closer the temperature detected by the temperature detector 12 is to the environmental temperature. That is, the first temperature offset amount is larger than the second temperature offset amount. Also, the second temperature offset amount is larger than the third temperature offset amount.

Subsequently, at step S405, the zoom/focus controller 13 calculates a temperature variation (i.e., temperature fluctuation) from the reference temperature of the reference state in consideration of the temperature offset amount calculated in any of steps S404, S409, and S410. That is, the zoom/focus controller 13 corrects the current temperature based on the temperature offset amount. For example, the zoom/focus controller 13 changes the reference temperature based on the temperature offset amount according to the drive state of the cooling fan 17. In other words, the zoom/focus controller 13 adds or subtracts the temperature offset amount to or from the preset reference temperature (original reference temperature) to calculates the reference temperature (corrected reference temperature) according to the drive state of the cooling fan 17. Here, the reference state indicates the setting state of the correction data previously stored in order to perform the focus correction in accordance with the temperature change. For example, a state in which the number of rotations of the cooling fan 17 is high (HIGH) and the temperature center is 20 deg C. is set as a reference state, and the degree of the focus correction is adjusted depending on whether the number of rotations or the temperature of the cooling fan 17 is changed from the reference state. Further, when calculating the temperature variation taking the offset value into consideration, this embodiment is not limited to adding (subtracting) the temperature offset amount with respect to the reference temperature in the reference state, and instead of changing the reference temperature, the temperature offset amount may be subtracted from (or added to) the detection temperature.

Subsequently, at step S406, the zoom/focus controller 13 calculates a difference (temperature difference) between the current temperature corrected at step S405 and the previous temperature. Subsequently, at step S407, the zoom/focus controller 13 performs the focus correction according to the temperature difference calculated at step S406.

This makes it possible to suppress a malfunction due to a change in the detection temperature caused by a change in the number of rotations of the cooling fan 17, and thus it is possible to perform appropriate focus detection and focus correction according to the temperature. In addition, as cases where the detection temperature changes even in a state where there is no change in the environmental temperature, the drive state of the heater attached to the image capturing apparatus 100 for making is possible to operate the image capturing apparatus 100 even in a low temperature state, a temperature rise of the temperature detector due to lighting of a built-in illumination of the image capturing apparatus 100, and the like are conceivable. Even in such cases, the effect of this embodiment can be obtained by applying the flowchart of FIG. 4 with respect to the temperature variation caused by the heater or the built-in illumination instead of the cooling fan 17.

In this embodiment, while the detection temperature is corrected based on the temperature offset amount from the reference temperature according to the number of rotations (rotation speed), the focus correction due to the temperature change by the temperature changer (the cooling fan 17) cannot be performed using a simple offset in some cases. In this case, it is preferable to change the focus correction amount (correction coefficient) for each rotation of the cooling fan 17.

Embodiment 2

Next, Embodiment 2 of the present invention will be described. In this embodiment, a method for detecting an appropriate temperature change immediately after the operation of a temperature variation factor is changed will be described. In this embodiment, a case where the rotation speed of the cooling fan 17 is changed will be described, but the present invention is not limited to this.

Commonly, when the number of rotations of the cooling fan 17 is changed, the flow rate taken into the image capturing apparatus 100 changes, so that the detection temperature of the temperature detector 12 changes as described above. For this reason, it is difficult to detect a correct temperature in a period until the temperature changes to a steady state as the flow rate changes. When the appropriate temperature change cannot be detected during this period, the focus correction cannot be appropriately performed, and as a result, the state is overcorrected or insufficiently corrected.

Figure 5A:
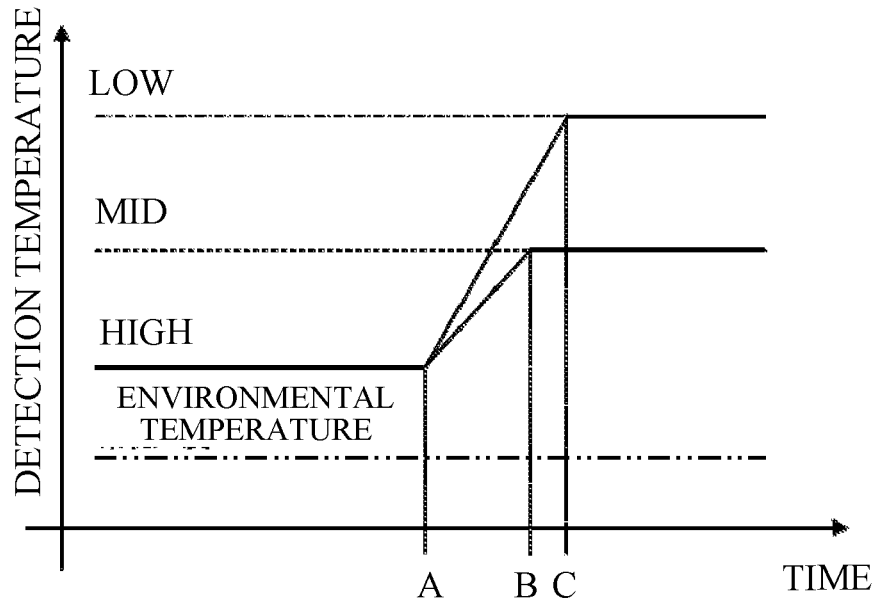
FIGS. 5A and 5B are diagrams illustrating a relationship between the number of rotations of the cooling fan and the detection temperature in Embodiment 2.
Figure 5B:
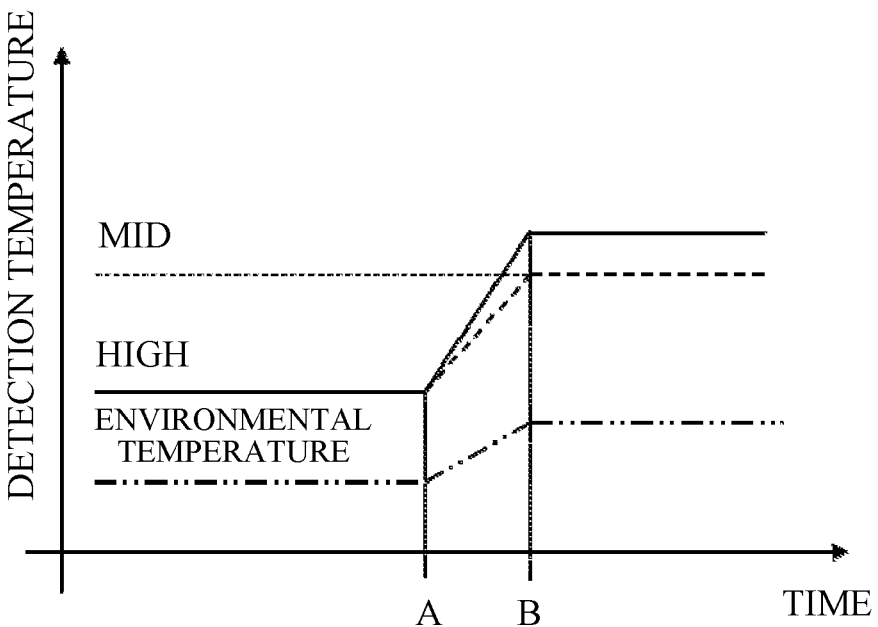

FIGS. 5A and 5B are diagrams illustrating the relationship between the number of rotations (that is, rotation speed) of the cooling fan 17 and the detection temperature, and FIG. 5A illustrates a case where the environmental temperature is constant and FIG. 5B illustrates a case where the environmental temperature changes. In FIGS. 5A and 5B, the case where the rotation speed of the cooling fan 17 is high is indicated as "High", the case where the rotation speed of the cooling fan 17 is low is "Low", and the case where the rotation speed of the cooling fan 17 is middle is "Mid". In FIGS. 5A and 5B, the horizontal axis represents time and the vertical axis represents the detection temperature.

When the number of rotations of the cooling fan 17 increases, the flow rate of taking in the outside air increases, so the detection temperature approaches the environmental temperature. For example, when the cooling fan 17 is changed from the High state to the Mid state, the detection temperature changes over time from a point A to a point B in FIG. 5A. This is caused by a change in the flow rate due to the change in the number of rotations of the cooling fan 17, and it takes a period from the point A to the point B until the cooling fan 17 is settled in the steady state, and thereafter, the rotation state of the cooling fan 17 is maintained in the Mid state, and therefore the detection temperature also becomes a steady state. Similarly, when the cooling fan 17 is changed from the High state to the Low state, the temperature change amount up to the steady state is large and the flow rate also decreases, and therefore the period from the point A to the point C is required until the temperature change ends to be in the steady state. Then, the detection temperature becomes the steady temperature in the Low state. As described above, even when the environmental temperature does not change, the detection temperature changes in accordance with the number of rotations of the cooling fan 17, and therefore it is difficult to stably detect the temperature immediately after the change in the number of rotations of the cooling fan 17.

When the cooling fan 17 is changed from the High state to the Mid state while the environmental temperature is in the steady state as illustrated in FIG. 5A, the temperature profile of the dotted line in FIG. 5B is depicted. On the other hand, when the environmental temperature changes as illustrated in FIG. 5B, the detection temperature between the point A and the point B, which is an unstable period of the detection temperature, becomes further distant from the actual condition. For this reason, it is difficult to correctly perform the temperature focus correction during the unstable period of the detection temperature. Therefore, in this embodiment, a method of more accurately detecting the temperature even during the unstable period of the detection temperature will be described.

Figure 6:
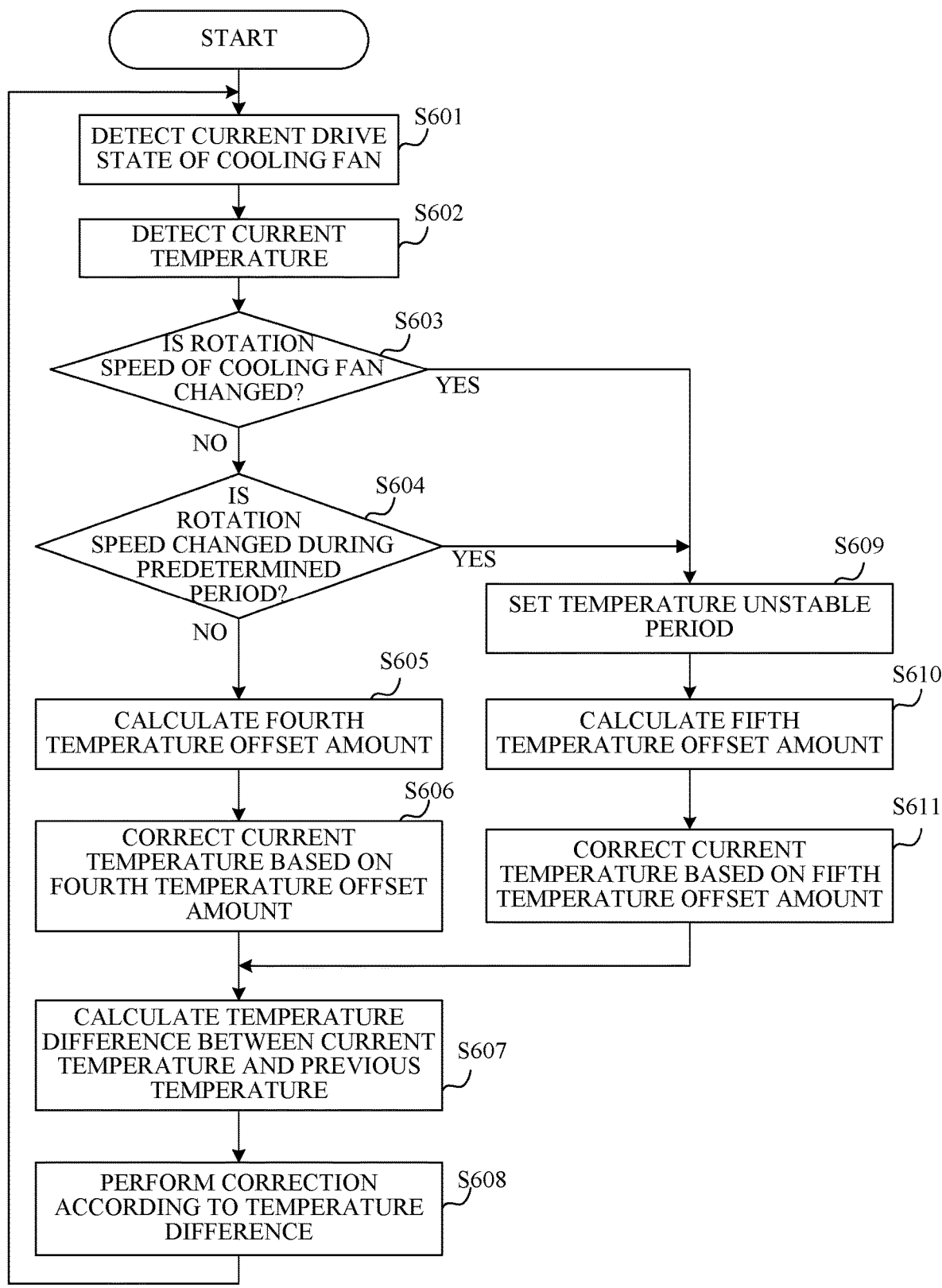
FIG. 6 is a flowchart illustrating a method of a temperature focus correction in Embodiment 2.

Referring to FIG. 6, a temperature focus correction method (a correction method according to the detection temperature) in this embodiment will be described. FIG. 6 is a flowchart illustrating a temperature focus correction method in this embodiment. Each step of FIG. 6 is mainly performed by the zoom/focus controller 13 (the data acquirer 13a and the focus controller 13b).

First, at steps S601 and S602, similarly to steps S401 and S402 in Embodiment 1, the zoom/focus controller 13 detects the drive states (rotation states) and the current temperatures of the cooling fan 17 at the previous time and the current time.

Subsequently, at step S603, the zoom/focus controller 13 determines whether the rotation state of the cooling fan 17 is changed. When the rotation state of the cooling fan 17 is changed, the flow proceeds to step S609. On the other hand, when the rotation state of the cooling fan 17 is not changed, the flows proceeds to step S604.

At step S604, the zoom/focus controller 13 determines whether the rotation state of the cooling fan 17 is changed within a predetermined period. This is to determine whether the current time is within the unstable period of the detection temperature as illustrated with reference to FIGS. 5A and 5B. When the rotation state of the cooling fan 17 is not changed within the predetermined period at step S604, the flow proceeds to step S605. On the other hand, when the rotation state of the cooling fan 17 is changed within the predetermined period, the flow proceeds to step S609.

At step S605, the zoom/focus controller 13 calculates a temperature offset amount (a temperature offset amount caused by a change in the rotation state of the cooling fan 17: a fourth temperature offset amount) from a preset reference state. Subsequently, at step S606, the zoom/focus controller 13 calculates the current temperature in consideration of the temperature offset amount calculated at step S605 (that is, corrects the current temperature based on the fourth temperature offset amount). Here, the reference state indicates, similarly to Embodiment 1, the setting state of the correction data stored previously in order to perform the focus correction in accordance with the temperature change. Furthermore, similarly to Embodiment 1, when calculating a temperature variation in consideration of the offset value, this embodiment is not limited to adding the temperature offset amount to the reference temperature of the reference state, and the temperature offset amount may be subtracted from (or added to) the detection temperature without changing the reference temperature.

At step S609, the zoom/focus controller 13 calculates an unstable period of the detection temperature according to the change in the number of rotations of the cooling fan 17. Subsequently, at step S610, the zoom/focus controller 13 calculates a temperature offset amount (fifth temperature offset amount) that varies according to the rotation speed of the cooling fan 17 during the unstable period of the detection temperature. The temperature offset amount can be calculated by previously storing data indicating how much time is required and how much temperature varies when the number of rotations of the cooling fan 17 is changed. As an example, the temperature focus correction coefficient memory 18 may have a table in which the corresponding temperature offset amount is stored at predetermined time intervals. Subsequently, at step S611, the zoom/focus controller 13 calculates the current temperature in consideration of the temperature offset amount calculated at step S610 (corrects the current temperature based on the temperature offset amount). The concept of temperature calculation (temperature correction) is the same as that at step S606.

Subsequently, at step S607, the zoom/focus controller 13 calculates a difference (temperature difference) between the current temperature corrected at step S606 or step S611 and the previous temperature. Subsequently, at step S608, the zoom/focus controller 13 performs the focus correction according to the temperature difference calculated at step S607.

As described above, in this embodiment, the focus controller 13b changes the focus correction (temperature offset amount) according to the elapsed time after changing the drive state of the cooling fan 17. This makes it possible to suppress a malfunction caused by a change in the detection temperature due to a change in the number of rotations of the cooling fan 17, and it is possible to perform an appropriate focus detection and perform temperature detection according to the temperature. Further, it is possible to detect an appropriate temperature change immediately after the number of rotations of the cooling fan 17 is changed.

Embodiment 3

Figure 7:
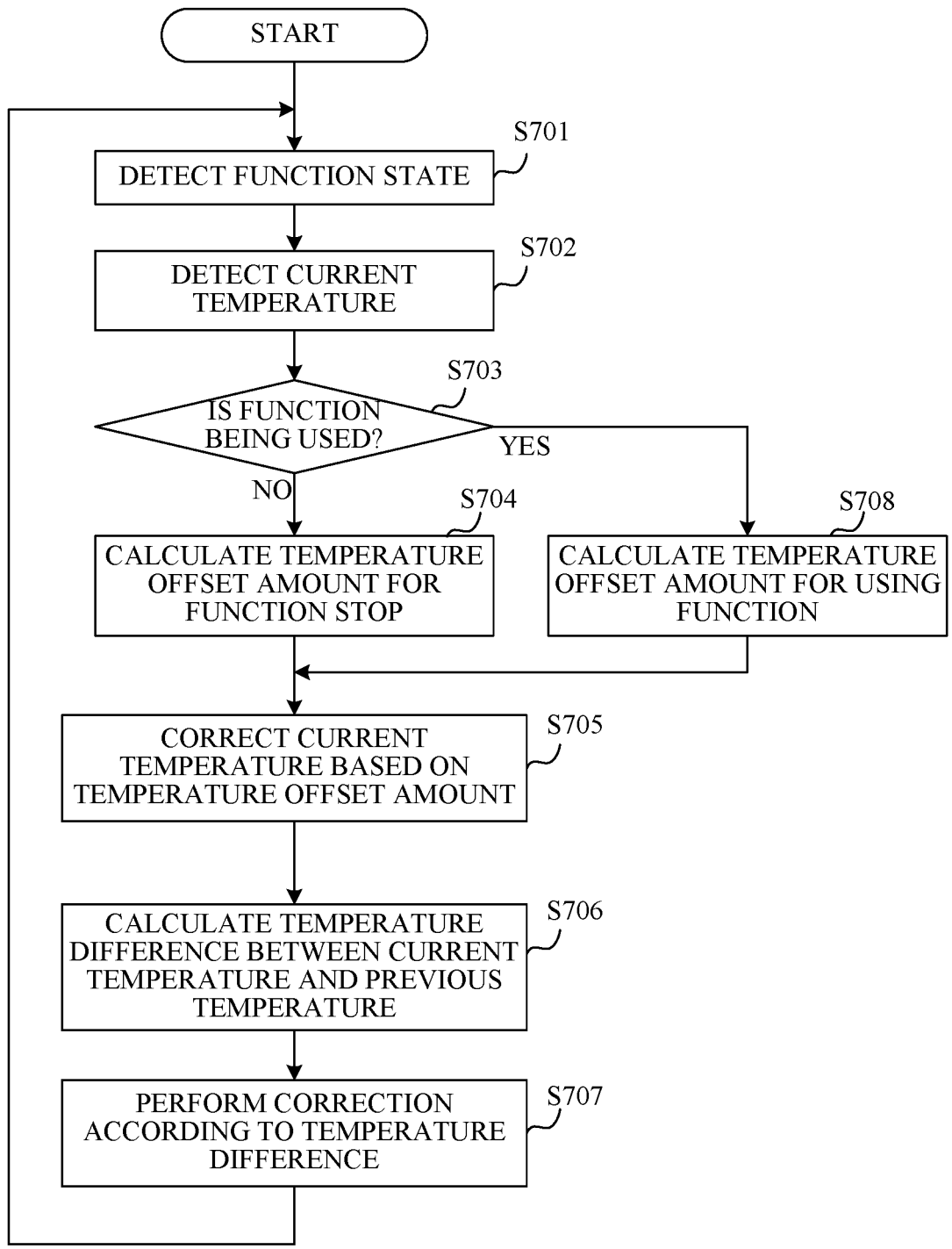
FIG. 7 is a flowchart illustrating a method of a temperature focus correction in Embodiment 3.

Next, referring to FIG. 7, a temperature focus correction method (a correction method according to the detection temperature) in Embodiment 3 of the present invention will be described. FIG. 7 is a flowchart illustrating the temperature focus correction method in this embodiment. Each step of FIG. 7 is mainly performed by the zoom/focus controller 13 (the data acquiring unit 13a and the focus controller 13b).

In this embodiment, the image capturing apparatus 100 includes a setting changer (setting changing unit) 25 that changes the setting of the panning/tilting function (pan-tilt function) for changing a direction (imaging direction) of the image capturing apparatus. For example, a surveillance camera is generally equipped with the pan-tilt function for changing the imaging direction. With such a surveillance camera, it is possible to perform photographing not only in a state in which the imaging direction is fixed but also preset patrol photographing in which photographing is performed in order for preset photographing objects at regular intervals. When the preset patrol photographing is to be performed, the pan-tilt motor is always driven, and accordingly there is a difference in power consumption between when the motor is driven and when it is stopped. As a result, even when there is no change in the external temperature, the temperature inside the surveillance camera changes, and there is a possibility that the external temperature cannot be estimated with high accuracy. This embodiment is not limited to the pan-tilt function, and it is applicable to other functions.

First, at step S701 of FIG. 7, the zoom/focus controller 13 detects a current function state (situation). In this embodiment, while the function state detected at step S701 is a situation as to whether the pan-tilt function is currently used (that is, a situation as to whether the pan-tilt operation is in progress), the present invention is not limited to this. Subsequently, at step S702, the zoom/focus controller 13 detects a current temperature using the temperature detector 12.

Subsequently, at step S703, the zoom/focus controller 13 determines whether the function is in use (that is, whether the pan-tilt function is being used). When it is determined that the pan-tilt function is not being used, the flow proceeds to step S704. At step S704, the zoom/focus controller 13 calculates a temperature offset amount for a stopped state of the function (offset amount for function stop), and the flow proceeds to step S705. On the other hand, when it is determined at step S703 that the pan-tilt function is being used, the flow proceeds to step S708. At step S708, the zoom/focus controller 13 calculates the temperature offset amount for using the function (offset amount for use of function), and the flow proceeds to step S705.

At step S705, the zoom/focus controller 13 calculates a temperature variation from the reference temperature in the reference state in consideration of the temperature offset amount calculated at step S704 or step S708. That is, the zoom/focus controller 13 corrects the current temperature based on the temperature offset amount. Here, the reference state indicates the setting state of the correction data stored previously in order to perform the focus correction in accordance with the temperature change. For example, a state in which the pan-tilt function is stopped and the temperature center is 20 deg C. is set as a reference state, and the degree of focus correction is adjusted according to whether the pan-tilt function from the reference state is in use. Correcting the current temperature based on the offset amount may be offset with respect to the reference temperature in the reference state or the offset may be performed on the detection temperature without changing the reference temperature.

Subsequently, at step S706, the zoom/focus controller 13 calculates a difference (temperature difference) between the current temperature corrected in step 705 and the previous temperature. Subsequently, at step S707, the zoom/focus controller 13 performs the focus correction according to the temperature difference calculated at step S706.

As described above, in this embodiment, the zoom/focus controller 13 (the focus controller 13b) performs the focus correction in accordance with the state of the setting changing unit (setting changer 25) that changes the setting of the function of the image capturing apparatus 100. According to this embodiment, it is possible to suppress malfunction of temperature estimation due to a change in detection temperature according to whether the pan-tilt function is used, and it is possible to perform appropriate temperature detection and focus correction according to the temperature.

In this embodiment, as a specific example of the function state (functional situation), ON/OFF of the pan-tilt function (whether the pan-tilt function is being used) is described, but the present invention is not limited to this. It is also conceivable that the pan-tilt operation is performed at high speed, the electric power is consumed more than usual to raise the torque, and the like. It is also conceivable that a process of accompanying heat generation other than the pan-tilt function is performed, for example, change in usage condition of functions occurs such that the process load state of an internal image capturing engine changes.

While Embodiments 1 and 2 describes the temperature variation mechanism (temperature changer) that changes the temperature as a cooling fan, the present invention is not limited to this, and it is also applicable to other temperature change mechanisms such as a heater and a water-cooling apparatus. Further, it is possible to replace the description about the temperature variation mechanism in each of Embodiment 1 and Embodiment 2 with the case where the usage situation (usage condition) of the function (for example, pan-tilt function) is changed by the setting changer 25 in Embodiment 3. In each of the embodiments, the interchangeable lens is described as an example, but the present invention is not limited to this, and the present invention is also applicable to a lens-integrated image capturing apparatus. In addition, in the case where the heat radiation path changes according to the position (position difference) of the image capturing apparatus, the temperature can be corrected more accurately by considering the position difference of the image capturing apparatus as well.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to each of the embodiments, it is possible to provide a control apparatus, an image capturing apparatus, and a control method which are capable of satisfactorily correcting a focus deviation caused by a temperature change of an image capturing optical system with a simple configuration.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-186463, filed on Sep. 27, 2017, and Japanese Patent Application No. 2018-150910, filed on Aug. 9, 2018, which are hereby incorporated by reference herein in their entirety.

What is claimed is:
1. A control apparatus comprising:
a data acquirer configured to acquire correction data indicating a relationship between a temperature difference between a temperature detected by a temperature detector and a reference temperature, and a focus movement amount; and
a focus controller configured to perform focus correction based on the temperature difference and the correction data to perform focus control,
wherein the focus controller is further configured to change the focus correction depending on a drive state of a temperature changer that changes a temperature, and wherein the focus controller is further configured to change the reference temperature depending on the drive state of the temperature changer.

2. The control apparatus according to claim 1, wherein the focus controller is configured to change the correction data depending on the drive state of the temperature changer.

3. The control apparatus according to claim 1, wherein the temperature changer is a cooling fan, and the drive state is a rotation state of the cooling fan.

4. The control apparatus according to claim 1, wherein the focus controller is configured to change the focus correction depending on a position of an image capturing apparatus.

5. The control apparatus according to claim 1, further comprising a memory storing the correction data,
wherein the data acquirer is configured to acquire the correction data stored in the memory.

6. A control apparatus comprising:
a data acquirer configured to acquire correction data indicating a relationship between a temperature difference between a temperature detected by a temperature detector and a reference temperature, and a focus movement amount; and
a focus controller configured to perform focus correction based on the temperature difference and the correction data to perform focus control,
wherein the focus controller is further configured to change the focus correction depending on a drive state of a temperature changer that changes a temperature, and
wherein the focus controller is further configured to change the temperature detected by the temperature detector depending on the drive state of the temperature changer.

7. A control apparatus comprising:
a data acquirer configured to acquire correction data indicating a relationship between a temperature difference between a temperature detected by a temperature detector and a reference temperature, and a focus movement amount; and
a focus controller configured to perform focus correction based on the temperature difference and the correction data to perform focus control,
wherein the focus controller is further configured to change the focus correction depending on a drive state of a temperature changer that changes a temperature, and
wherein the focus controller is further configured to change the focus correction depending on an elapsed time after changing the drive state of the temperature changer.

8. An image capturing apparatus comprising:
an image sensor configured to photoelectrically convert an optical image formed via an image capturing optical system;
a temperature detector configured to detect a temperature;
a data acquirer configured to acquire correction data indicating a relationship between a temperature difference between a temperature detected by the temperature detector and a reference temperature, and a focus movement amount;
a focus controller configured to perform focus correction based on the temperature difference and the correction data to perform focus control; and
a temperature changer configured to change a temperature,
wherein the focus controller is further configured to change the focus correction depending on a drive state of the temperature changer, and
wherein the focus controller is further configured to change the reference temperature depending on the drive state of the temperature changer.

9. A control method comprising the steps of:
acquiring correction data indicating a relationship between a temperature difference between a temperature detected by a temperature detector and a reference temperature, and a focus movement amount; and
performing focus correction based on the temperature difference and the correction data to perform focus control,
wherein performing the focus control includes changing the focus correction depending on a drive state of a temperature changer that changes a temperature, and
wherein performing the focus control further includes changing the reference temperature depending on the drive state of the temperature changer.

* * * * *